INVENTOR
HAROLD SMOLA
BY
S. C. Yeaton
ATTORNEY

INVENTOR.
HAROLD SMOLA
BY S.C. Yeaton
ATTORNEY

Nov. 7, 1967 H. SMOLA 3,351,928

DISPLAY APPARATUS

Filed Feb. 17, 1964 4 Sheets-Sheet 3

INVENTOR.
HAROLD SMOLA
BY B. C. Yeaton
ATTORNEY

INVENTOR.
HAROLD SMOLA
BY
ATTORNEY

United States Patent Office 3,351,928
Patented Nov. 7, 1967

3,351,928
DISPLAY APPARATUS

Harold Smola, Carle Place, N.Y., assignor to Sperry Rand Corporation, Great Neck, N.Y., a corporation of Delaware Filed Feb. 17, 1964, Ser. No. 345,328
9 Claims. (Cl. 340—324)

Figure 2B:
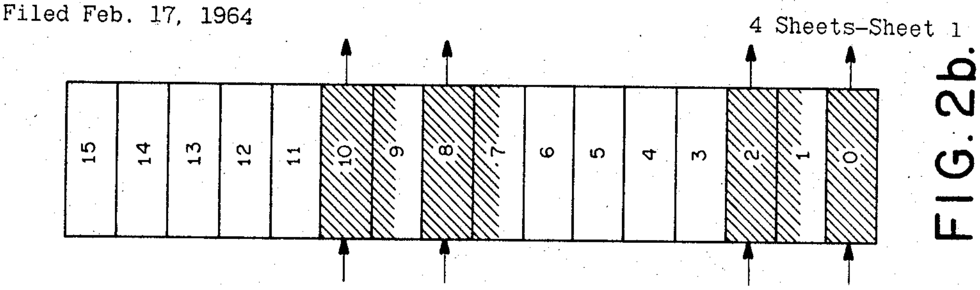

This invention relates in general to indicating devices and in particular improves on the apparatus described in copending application S.N. 208,219, now Patent number 3,221,169, such patent being for an electroluminescent display that cooperates with a logic circuit employing digital computing techniques. In so improving on the apparatus of Patent 3,221,169, simplicity in logic circuit construction is provided and, in addition, the speed with which a complete display (incidentally, having even intensity illumination) appears is increased.

Generally, electroluminescent displays utilize a plurality of electroluminescent elements which are selectively excited by means of a logic circuit to indicate the magnitude of a digital number received at the input to the logic circuit. In the aforesaid copending application, twelve logic AND gate elements are shown being necessary to display the magnitude of a three bit digital input, whereas by means of the present invention such AND gate elements may be reduced in number to six. This feature is provided by separating the functions of the higher bit orders from those of the lower bit orders for any given digital input. That is, the aforesaid plurality of electroluminescent elements is divided into as many groups as may be selected by the higher of as near to one half the bit orders, and by using as many electroluminescent elements in each group as may be selected by the remaining or lower bit orders, cooperation may be had between the two groups of bit orders whereby the required number of logic circuit elements may be drastically reduced.

As taught also in Patent 3,221,169, one a given electroluminescent element is selected and lighted in response to a given logic circuit digital input, all electroluminescent elements associated with smaller digital numbers are also lighted, thereby providing, for example, a display similar in appearance to a bar graph. In lighting up such other elements, a relatively long period of time (dependent directly on the number of elements to be lighted) is required to complete the "bar."

Shortening the time to light a "bar" can be had by taking advantage of the fact that while higher bit orders are used to excite respective groups of electroluminescent elements, they nevertheless are still but a part of an overall logic circuit employing also lower bit orders. In other words, the higher bit orders form a first sublogic circuit for selecting groups of electroluminescent elements, and the lower bit orders form a second sublogic circuit for selecting specific elements in the groups of elements. Together, however, both sublogic circuits form an overall logic circuit for selecting a particular element representative of an input digital number received by the overall circuit. By way of example, in a logic circuit employing the invention with two higher ($2^3$,$2^2$) and two lower bit orders ($2^1$,$2^0$), the sublogic circuit comprising the higher bit orders may select any one of four groups of four electroluminescent elements, say group 3, i.e. there are sixteen electroluminescent elements and only the highest bit order ($2^3$) is excited. (The specific element in each group, though chosen by selectively exciting the lower bit orders comprising the other sublogic circuit, is of no account for purposes of increasing the time needed to illuminate a whole "bar.") This means that of the sixteen electroluminescent elements, only the ninth up from the base of the bar is illuminated. By using a redundant or extra logic AND gate element adapted to receive both the input bit to the highest order logic element and the output from such highest order element, and then applying the output from the redundant element to excite the element group selectable by the next lower bit order in the sublogic circuit consisting of the higher bit orders, fill-in of the bar will be quick and parallel in nature, instead of being slow and in a sequential fashion as in the prior art.

What has been suggested above as a technique for providing quick fill-in of a "bar" resulting from a four bit digital input number may be extended to similar systems having any number of input bits greater than four. However, in all such cases the above-described sublogic circuit of higher bit orders with the additional or redundant logic element will be a basic building block from which other combinations of elements (all employing the above-described technique) may pyramid.

The technique for providing even intensity illumination of a "bar" display will be described later.

A principal object of the invention is to provide a simplified logic circuit for selectively exciting a display consisting of electroluminescent elements.

Another object of the invention is to provide apparatus having a plurality of illuminable elements arranged according to values that they respectively represent, which elements are selectively excited, and wherein all elements representing lower values than that of a selected element are also excited with that element to illuminate with equal intensity light.

Another object of the invention is to provide apparatus having a plurality of illuminable elements arranged according to a value that they respectively represent, which elements are selectively excited, and wherein all elements representing lower values than that of a selected element get to be excited with that element, said apparatus including means to speed up the excitation of such lower value representative elements after said selected element is excited.

Another object of the invention is to provide apparatus having a plurality of illuminable elements arranged according to a value that they respectively represent, which elements are selectively excited, and wherein all elements representing lower values than that of a selected element get to be excited with that element to illuminate with equal intensity light, and including means to speed up the excitation of such lower value representative elements after said selected element is excited.

Another object of the invention is to provide a logic circuit for use in selecting a particular excitable element from within a plurality of elements, wherein higher bit orders are employed to select one particular group of a plurality of groups of elements, and lower bit orders are employed to select particular elements in said groups of elements.

Figure 2A:
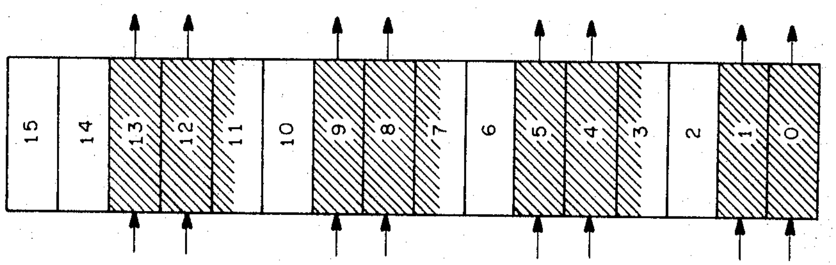
Figure 1:
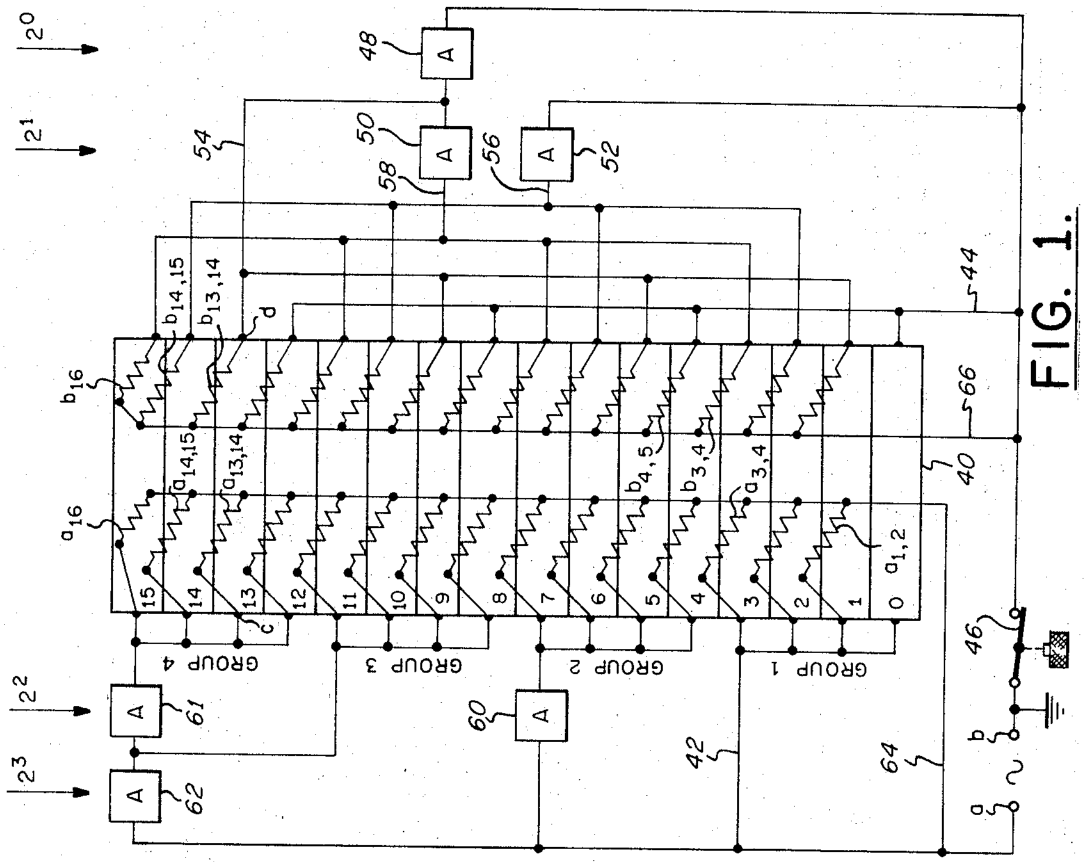
Figure 4B:
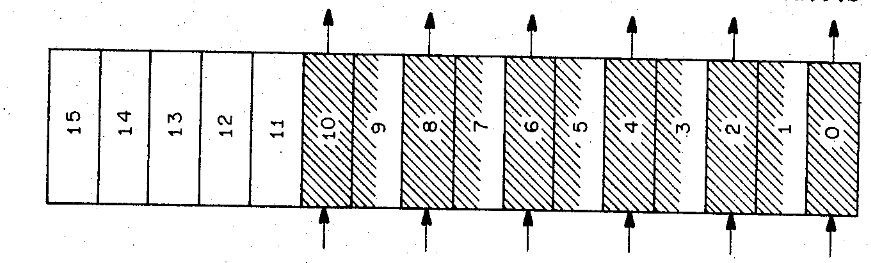
Figure 4A:
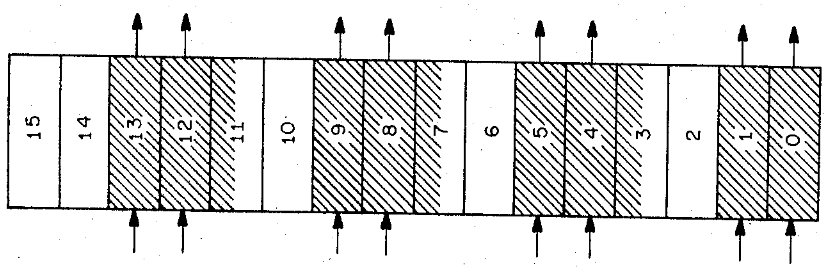
Figure 3:
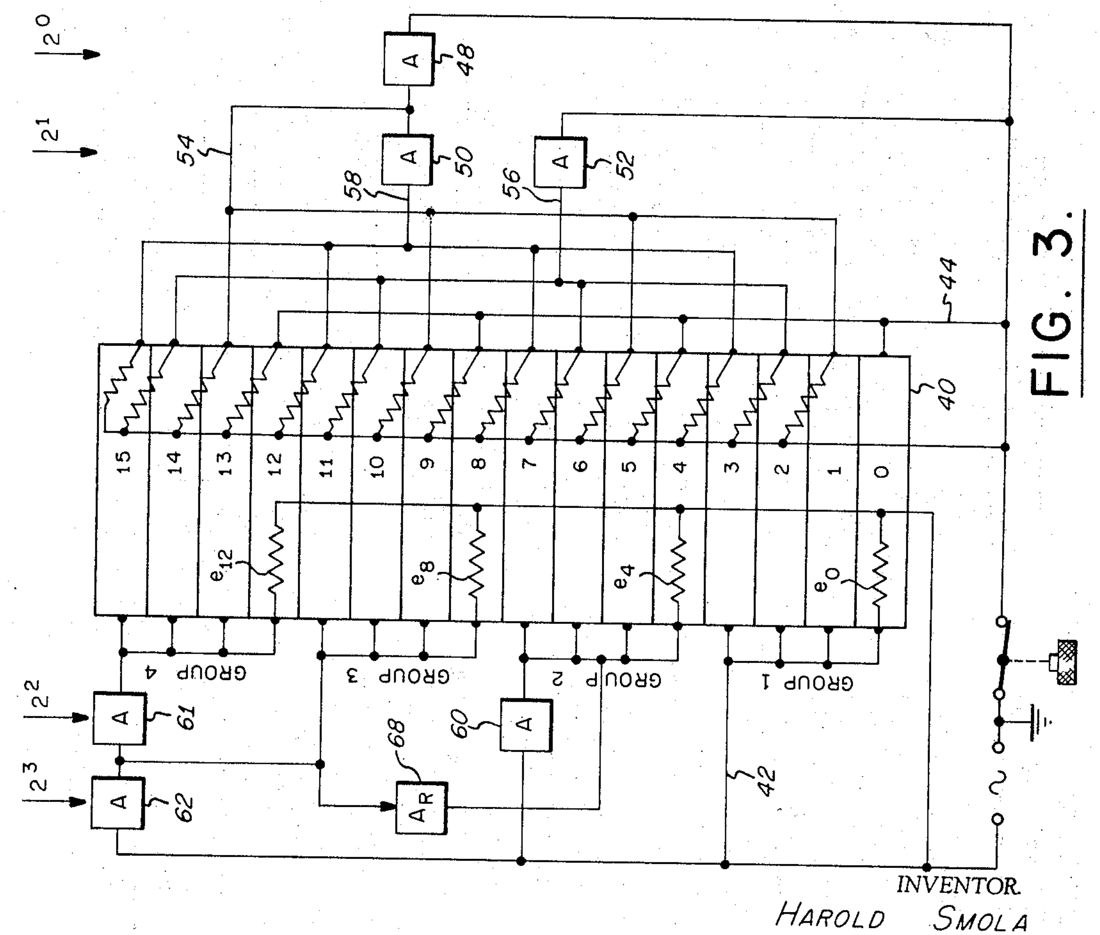
Figure 5:
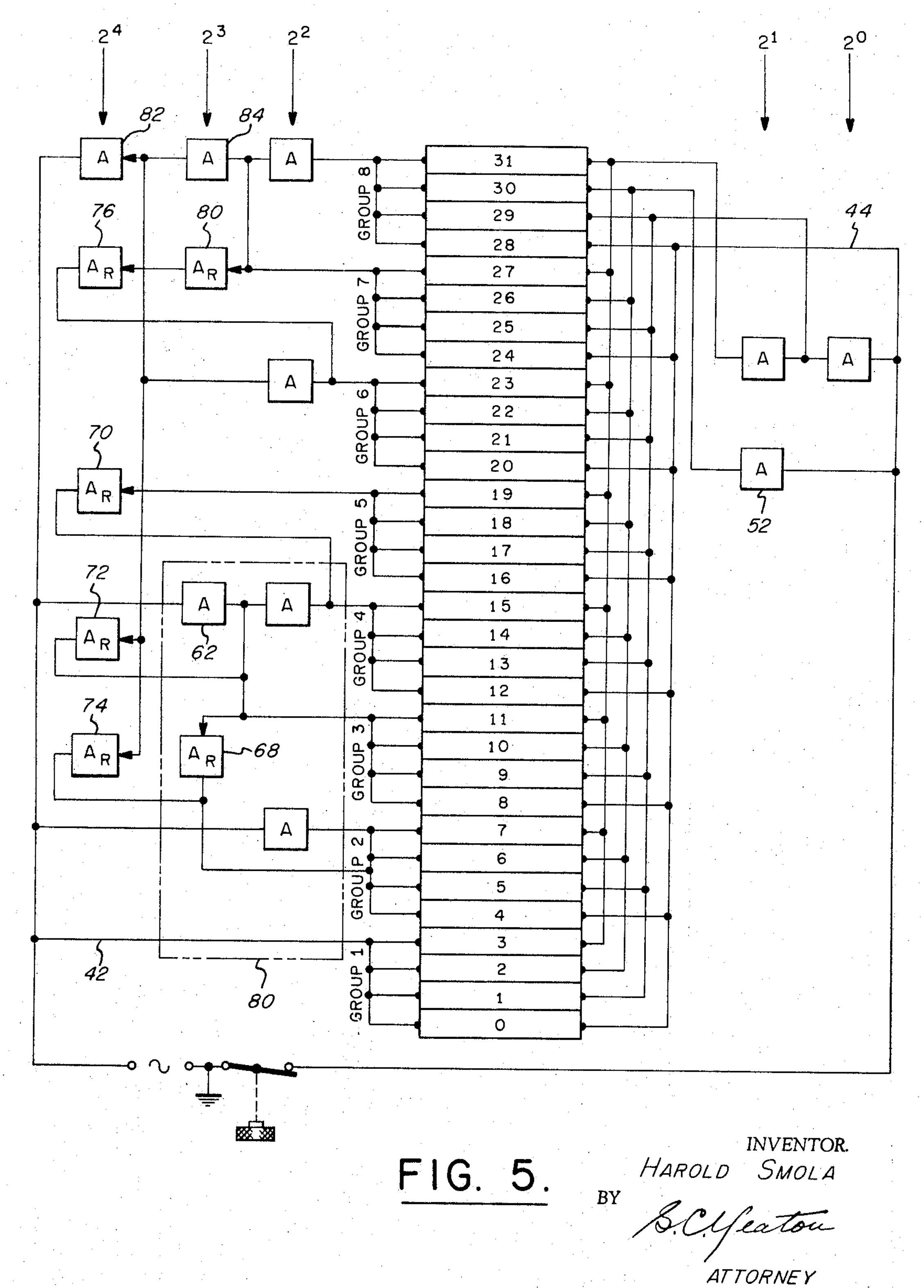
Figure 6:
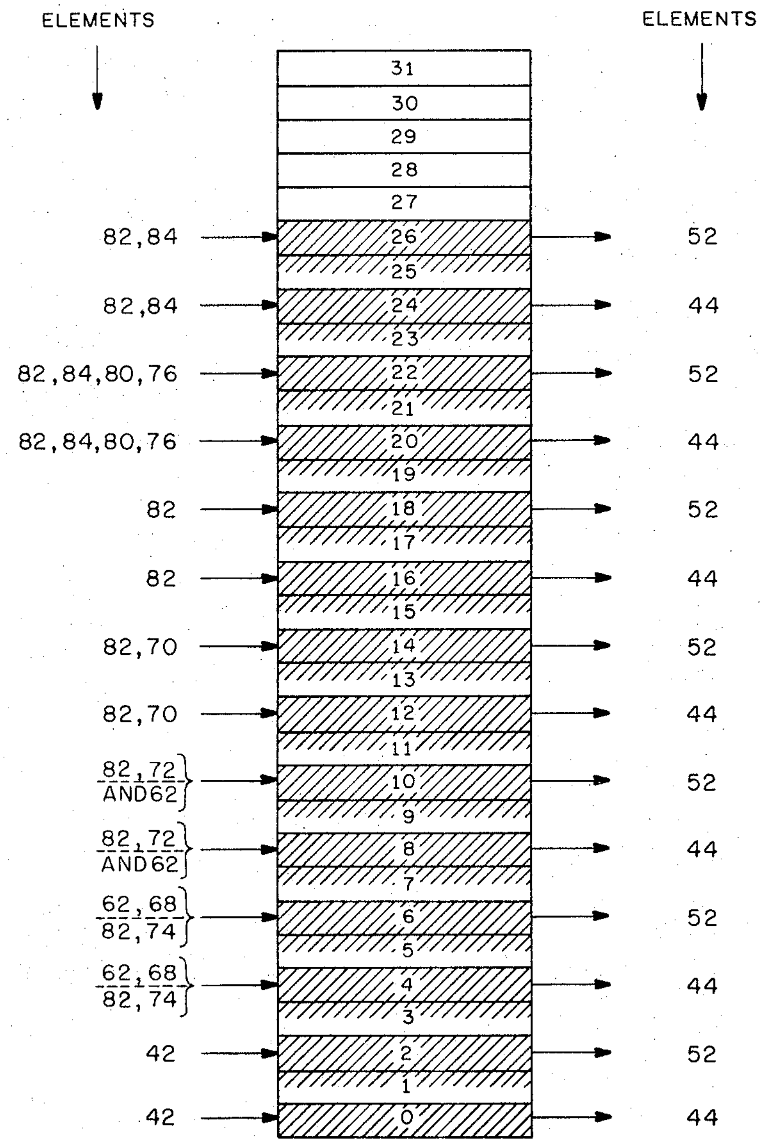

The invention will be described with reference to the figures wherein:

FIG. 1 is a schematic block diagram of one form of the invention,

FIGS. 2*a* and 2*b* are diagrams useful in explaining the operation of the apparatus of FIG. 1, FIG. 3 is a schematic block diagram of a basic building block of a presently preferred form of the invention, FIGS. 4*a* and 4*b* are diagrams useful in describing the apparatus of FIG. 3, FIG. 5 is a schematic block diagram of apparatus embodying the invention and being adapted to handle five bit digital input members, FIG. 6 is a diagram useful in explaining the operation of the apparatus of FIG. 5.

Referring to FIG. 1, a display member 40 having a stack of sixteen electroluminescent elements numbered 0–15 cooperates with a four bit logic circuit adapted to receive input signals on leads indicated by arrows. The logic circuit elements are AND gates and are arranged in columns (of one or two elements) so that all logic circuit elements in a particular column are excited when its respective arrow indicative lead is excited. Deliberately, the arrow indicative leads are not shown being brought to each logic element in the respective columns to simplify the drawing and prevent confusion. The sixteen electroluminescent elements 0–15 are divided into four groups (numbered 1–4) since the sublogic circuit of the higher bit orders ($2^3$, $2^2$) can select a maximum of only four groups. Similarly, the groups of electroluminescent elements each contain four elements since the sublogic circuit consisting of the lower bit orders ($2^1$, $2^0$) can select only one element from a maximum of four elements.

A source of electrical energy is connected across contacts *a*, *b* and excites, via a lead 42, the left hand side of the first group of electroluminescent elements, the circuit being completed through only the first electroluminescent element via a lead 44, which lead also connects to the lowest electroluminescent element in each group, viz. elements 4, 8 and 12. Hence, the first electroluminescent element is always lit so long as an erase switch 46 is closed, such switch being possibly also a part of the overall logic circuit. On the right hand side of FIG. 1 are logic circuit AND gate elements 48, 50 and 52, the element 48 being excitable by the $2^0$ bit order and the elements 50 and 52 being excitable by the $2^1$ bit order. By solely exciting the element 48 with a $2^0$ bit, the excitation circuit is completed not only through electroluminescent element 0, but also through electroluminescent element 1 via a lead 54 (which lead also connects to elements 1, 5, 9, and 13) and element 48. A sole $2^1$ bit similarly completes the excitation circuit through electroluminescent element 2 via a lead 56 (which is connected to elements 2, 6, 10 and 14), and simultaneously received $2^0$ and $2^1$ bits complete the excitation circuit through electroluminescent element 3 via a lead 58 (the lead 58 being connected to elements 3, 7, 11 and 15).

While the lead 42 is continuously connected to excite the lowest numbered group and keep thereby electroluminescent element 0 continually lit, the higher numbered groups of elements are selectively excited: a logic circuit AND gate element 60 when excited by a sole $2^2$ bit to the overall logic circuit (an AND gate 61 being here also simultaneously excited) excites the left hand side of the apparatus of FIG. 1, causing thereby the electroluminescent element 4 in group 2 to light. Of course, depending on which, if any, of the AND gates 48, 50 and 52 are excited by received bits, electroluminescent elements 5, 6 and 7 may also light. Receipt by the overall logic circuit of a sole $2^3$ bit at the input to an AND gate logic element 62 similarly causes the left hand side of element group 3 to become excited, and again depending on element selection by logic elements 48, 50 and 52, the elements 9, 10 and 11 may, in addition to element 8, also light. Likewise, receipt of both $2^3$ and $2^2$ bits will cause element 12, and also possibly one of the elements 13–15, to become lit.

As taught in Patent 3,221,169 diagonal photoelectric elements cooperating with adjacent electroluminescent elements are employed to "fill-in" a display bar. In practicing the form of the invention shown in FIG. 1, two sets of such diagonals are required, being respectively for shorting out each of the sublogic circuits on receipt of applied bit orders, and being designated by $a_{n,n+1}$ and $b_{n,n+1}$. While such diagonal elements are shown embracing but two adjacent electroluminescent elements they, like the diagonals of Patent 3,221,169, may embrace a greater number of adjacent electroluminescent elements if desired.

To understand the operation of the apparatus of FIG. 1, reference should also be had to FIGS. 2*a* and 2*b*. By applying $2^3$, $2^2$ and $2^0$ bits to the overall logic circuit, the electroluminescent element 13 (see FIG. 2*a*) is excited by power passing therethrough via elements 62, 61 the terminal contacts *c* and *d* of elements 13, and finally through element 48. Simultaneously, power passes through element 12 because its input terminal receives the same input signal as is applied to element 13, and because each fourth element is grounded via the lead 44. Element group 3 in receiving the output signal from the gate 62 causes its element 9 to become excited, its output circuit being connected to ground via the lead 54 and the element 48. Like element 9, element 5 is excited since the gate circuit 60 applies an output signal to element group 2 in response to a received $2^2$ bit. Element 1 is excited since its input terminal is connected directly to the source of electrical power, and because its output terminal is connected to ground via the lead 54 and the gate 48. Elements 8, 4 and 0, like element 12, get excited since their respective output terminals connect always to ground via the lead 44. When element 13 lights, it casts light onto photoelectric elements $a_{13,14}$ and $b_{13,14}$ causing such elements to cease being high resistances and instead becoming good conductors, the closed circuit being now also through these photoelectric elements to the element 13 terminals *c* and *d* via power leads 64, 66. Hence, excited elements remain excited even though the input bit orders are in the form of short duration pulses, i.e. the display is "locked-in" once the logic circuit responds to an input number and so long as the erase switch 46 remains closed.

As to "filling in" the bar display, e.g., elements 11, 10, 7, etc., this is accomplished as follows: Once one electroluminescent element lights, the next lower element of the display receives power via a circuit consisting of two photoelectric elements. Taking unlit element 3 by way of example, lighted element 4 casts its light onto photoelectric elements $a_{3,4}$ and $b_{3,4}$ whereby they become conductors causing power to be applied to element 3 via the lead 64, the input and the output terminals of element 3, and finally back to ground via the lead 66.

In applying an input digital number to cause electroluminescent elements 10 to light, i.e., by applying $2^3$ and $2^1$ bits, only elements 10, 8, 2 and 0 light initially since these alone of the solely excited groups 3 and 1 have their output circuits connected to ground, via respectively the AND gate 52 and the lead 44. Fill-in now must require a relatively substantial time period since each element 1–15 only works to turn on its next lower adjacent element in a sequential or progressive manner. To shorten this time period (and therefore allow for an increase in the display flicker rate when the logic circuit is adapted to receive short duration pulse bit information), the apparatus of FIG. 1 may be modified slightly as shown in FIG. 3 to permit each lower numbered group to become excited simultaneously with a particular selected group.

In FIG. 3 the sublogic circuits of the ($2^3$, $2^2$) and ($2^1$, $2^0$) bit orders are the same as shown in FIG. 1 with one exception. A redundant AND gate logic element 68 is adapted to receive the output signal from the logic element 62 simultaneously with any received $2^3$ bit, which of course gets applied also to the logic element 62. The output signal if any from the redundant gate element 68 is applied to that group (viz. group 2) of electroluminescent elements which, in the FIG. 1 configuration, does not receive an input signal when only the $2^3$ bit order is excited. Now, regardless of whether the $2^3$ or $2^2$ bit order is excited, fill-in will occur simultaneously for each group lower in number than the selected group. In applying a digital number representative of decimal 13 to the overall logic circuit, i.e., $2^3$, $2^2$ and $2^0$ bits, lower numbered groups (see FIG. 4*a*) than group 4 will, as described with reference to FIG. 1, get excited because the logic gate 60 provides an output signal to excite group 2, whereas group 3 is excited by the output of gate 62, and whereas group 1 is always excited via the direct connection of lead 42 to the source of power. Selection however of the electroluminescent element 10 by application of $2^3$ and $2^1$ bits to the apparatus of FIG. 3 causes fill-in to occur more quickly here than with the FIG. 1 apparatus, such being shown by FIG. 4*b*. That is, the redundant gate element 68 provides an output signal which lights elements 6 and 4 via closed circuits respectively through the logic gate element 52 and the lead 44.

Ignored in the above discussion is the manner in which successive electroluminescent elements progressively get lit. This may occur exactly in the manner described with reference to the FIG. 1 banks of photoelectric elements $a_{n,n+1}$ and $b_{n,n+1}$ or, as is preferred, in the manner described below.

Since input signals are always received by groups lower in number than a selected group, one photoelectric element $e_n$ may be employed to bring power to each group instead of one photoelectric element being necessary to bring power to each electroluminescent element. In this way, not only are the necessary power applying photoelectric elements reduced in number but further, by shorting the $2^3$–$2^2$ bit sublogic circuit by means of the photoelectric elements $e_n$, each electroluminescent element below the selected one is assured of being excited by exactly the same voltage as the selected element, resulting in even intensity illumination of the entire display bar regardless of the magnitude of the input number, and in spite of the fact that only one photoelectric element is used for each group. The photoelectric elements $b_{n,n+1}$ function as described above with relation to FIG. 1 to ground successively the right hand sides of the electroluminescent elements.

The $2^3$–$2^2$ bit sublogic circuit for the apparatus of FIG. 3 constitutes a basic building block from which forms of logic circuits, adaptable for greater input number capabilities, may pyramid. FIG. 5, for example, shows this sublogic circuit enclosed within dashed lines 80 and forming a basic part of five bit overall logic circuit. Redundant logic gate elements being like the AND gate element 68 and being designated $A_R$, receive input bits simultaneously with output signals from logic elements logically arranged in the same orders as such redundant gate elements, and apply their respective output signals to those groups of electroluminescent elements which do not receive input signals when such higher orders are excited. For example, when only the $2^4$ bit order is excited to light element 16 via group 5, redundant gates 70, 72 and 74 excite groups 4, 3 and 2 respectively, group 1 being always excited via the lead 42. Also, were the $2^4$, $2^3$ bit orders both excited to light element 24 via group 7, redundant gates 76 and 80 would cooperate to excite group 6, the groups 5, 4, 3, 2 and 1 being excited as described immediately above. FIG. 6 shows how the apparatus of FIG. 5 fills-in when, for example, such apparatus receives $2^4$, $2^3$ and $2^1$ input bits to light electroluminescent element 26, FIG. 6 also indicating by means of numerals the closed circuits by which fill-in is accomplished. Photoelectric elements are not shown on FIG. 5 for purposes of clarity.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Indicating apparatus comprising a plurality of electroluminescent elements, a logic circuit for exciting selected electroluminescent elements, said logic circuit being adapted to receive bits of as large a binary number as there are elements in said plurality of elements, said logic circuit consisting of first and second sublogic circuits connected to receive the higher order bits and the lower order bits respectively of said binary number, said plurality of elements being divided into as many group as said first sublogic circuit may select, each of said groups having as many elements as may be selected by said second sublogic circuit, means responsive to said higher ordered bits to apply power through said first sublogic circuits to a selected combination of groups, said selected combination being representative of the particular binary value of the higher ordered bits, and means responsive to said lower ordered bits to apply power through said second sublogic circuit to corresponding selected elements in each group, each of said selected elements being representative of the particular binary value of the lower ordered bits.

2. The apparatus of claim 1 wherein said electroluminescent elements are arranged to form a column of elements, and wherein said apparatus also includes means to excite all of said elements in said column which are below the particular element that lights.

3. The apparatus of claim 1 wherein said electroluminescent elements are arranged according to successively higher assigned values and wherein the first sublogic means further includes redundant logic means for exciting with said power all elements of said plurality of elements having assigned values less than the assigned value of the highest valued selectively excited element.

4. Display apparatus for indicating the value of a binary number comprising means to receive two binary bits from said number, a plurality of four electroluminescent indicating means, first and second AND gates arranged to receive respectively the higher and lower of said two binary bits, said second AND gate being adapted to receive the output signal from said first AND gate and apply its own output to a first of said four indicating means, a redundant AND gate arranged to receive the higher of said binary bits, the output of said first AND gate being applied also to said redundant AND gate and to the second of said four indicating means, a third AND gate adapted to receive the lower of said two binary bits, the output circuits of said redundant AND gate and said third AND gate being tied together and to the third of said four indicating means, and means for applying power directly to the fourth of said four indicating means and to said first and third AND gates.

5. The apparatus of claim 4 wherein each indicating means comprises four electroluminescent elements electrically connected in parallel.

6. Display apparatus comprising four groups of four illuminable elements, the input circuit of each element in each group being electrically connected in parallel with each other element in that group, first and second AND gates arranged to receive respectively the higher and lower of two binary bits, said second AND gate being adapted to receive the output signal from said first AND gate and apply its output to a first of said four groups of illuminable elements, a redundant AND gate arranged to receive the higher of said two binary bits, the output of said first AND gate being applied also to said redundant AND gate and to the second of said four groups of elements, a third AND gate adapted to receive the lower of said two binary bits, the output circuits of said redundant AND gate and said third AND gate being applied to the third of said groups of illuminable elements, means applying power directly to the fourth of said groups of elements, and to the first and third of said AND gates, the output circuits of corresponding elements in the groups of elements being electrically tied together to provide four output leads, and logic circuit means for selectively connecting one of said leads to electrical ground.

7. The apparatus of claim 6 wherein said logic circuit means comprises a pair of AND gates adapted to receive respectively higher and lower order bits and another AND gate adapted to receive said higher order bit, said last named AND gate being adapted to connect one of said output leads to electrical ground, the AND gate adapted to receive said lower order bit being adapted to connect the second of said leads to electrical ground, said first and second AND gates being adapted to connect serially the third of said leads to electrical ground, and the fourth of said leads being connected directly to electrical ground.

8. Indicating apparatus comprising a plurality of electroluminescent elements arranged in a pattern representing increasing numerical values, a logic circuit for selectively exciting various combinations of said elements, said logic circuit being adapted to receive bits of as large a binary number as there are elements in said plurality of elements, said logic circuit consisting of first and second sublogic circuits and said plurality of elements being divided into as many groups as said first sublogic circuit may select, each of said groups having as many elements as may be selected by said second sublogic circuit, corresponding elements in each group being electrically connected together, means for applying electrical power selectively through said first sublogic circuit to the group containing the element representing the numerical value of a received binary number and to each group corresponding to lesser numerical values, whereby depending on which of the bit orders in said second sublogic circuit get excited a particular electroluminescent element in each group receiving power through said first sublogic circuit lights, than the applied number, and means for progressively exciting all of said elements representative of binary numbers lower in value than the binary number applied to said logic circuit which are not excited through said first sublogic circuit.

9. The apparatus of claim 8 including means for so shorting the outputs of said first sublogic circuit that the voltages developed across all said excited electroluminescent elements are substantially equal.

References Cited

UNITED STATES PATENTS

| | | | |
|---|---|---|---|
| 2,955,231 | 10/1960 | Aiken | 340—324 |
| 3,218,497 | 11/1965 | Motson | 345—169 |
| 3,221,169 | 11/1965 | Joline | 315—169 |
| 3,221,170 | 11/1965 | Sylvander | 315—169 |
| 3,240,990 | 3/1966 | Blank et al. | 315—169 |
| 3,263,120 | 7/1966 | Aiken | 315—169 |

NEIL C. READ, *Primary Examiner.*

A. J. KASPER, *Assistant Examiner.*